United States Patent

[11] 3,588,536

| [72] | Inventor | George Dykeman<br>Dormont Borough, Pa. |
|---|---|---|
| [21] | Appl. No. | 745,342 |
| [22] | Filed | July 16, 1968 |
| [45] | Patented | June 28, 1971 |
| [73] | Assignee | United States Steel Corporation |

[54] PULSE HEIGHT ANALYZER
4 Claims, 2 Drawing Figs.

[52] U.S. Cl.................................................. 307/235,
307/322, 250/83.3, 328/117, 328/147
[51] Int. Cl....................................................... G01r 29/02,
H03k 4/78
[50] Field of Search........................................... 328/115,
140, 135, 147, 117; 307/235, 231, 217, 322

[56] References Cited
UNITED STATES PATENTS

| 2,557,636 | 6/1951 | Crumrine.................... | 328/115 |
| 2,638,273 | 5/1953 | Jensen et al................. | 328/115 |
| 2,694,146 | 11/1954 | Fairstein...................... | 328/115 |
| 3,093,799 | 6/1963 | Hansen........................ | 328/115 |
| 3,119,070 | 1/1964 | Seliger......................... | 328/132 |
| 3,136,902 | 6/1964 | Kerns.......................... | 328/115 |
| 3,219,939 | 11/1965 | Vincent....................... | 328/140 |

*Primary Examiner*—Donald D. Forrer
*Assistant Examiner*—Harold A. Dixson
*Attorney*—Martin J. Carroll ABSTRACT: A pulse height analyzer particularly for use with a coating thickness gauge including a thin window X-ray tube, a thin window proportional detector, a linear amplifier connected to the detector, a pair of discriminators connected in parallel to the amplifier, a counting rate meter connected to each discriminator and providing rate signals proportional to numbers of various level pulses detected, and a differential amplifier connected to the outputs of the rate meters and providing pulse rate information for a specific radiation pulse level band. Also, a reverse biased tunnel diode discriminator having means to block negative going signals in series with the input to the cathode of the tunnel diode.

PATENTED JUN28 1971 3,588,536
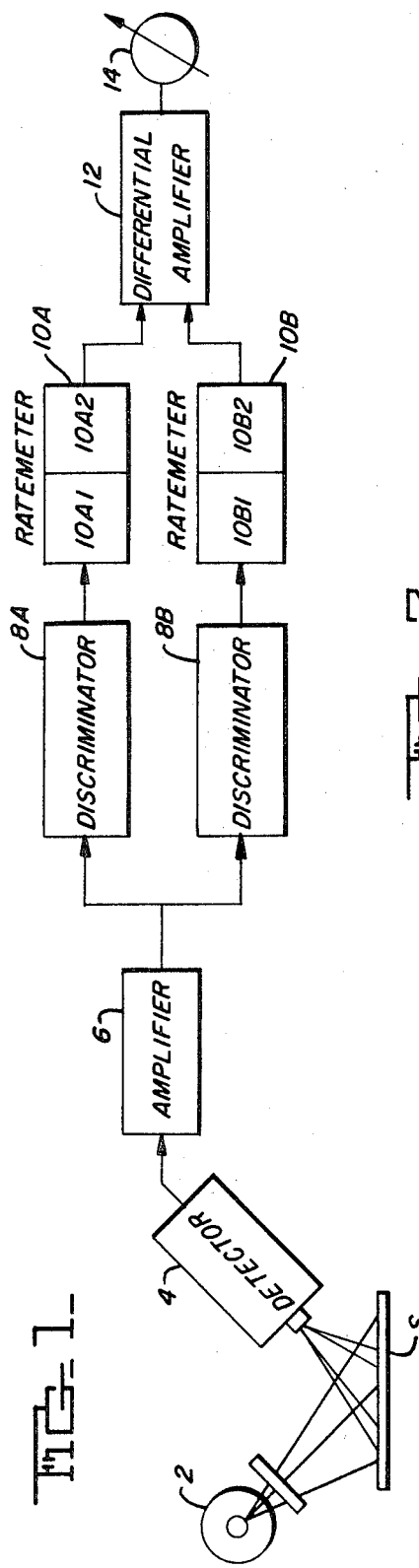
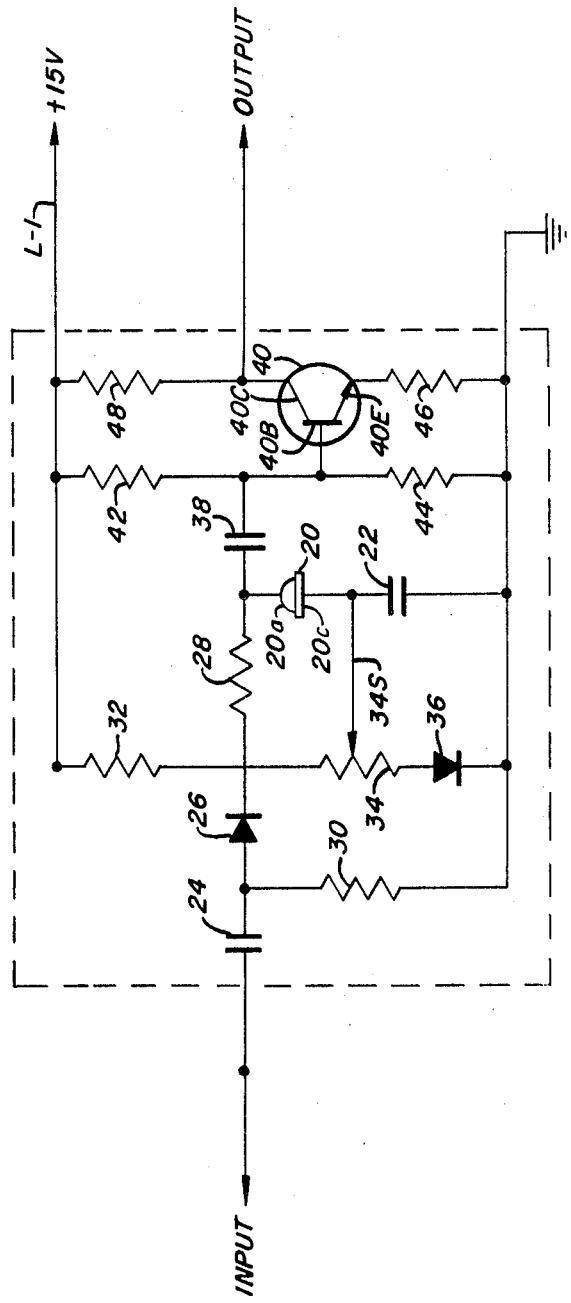
INVENTOR
GEORGE DYKEMAN
By Martin J. Carroll
Attorney

PULSE HEIGHT ANALYZER

This invention relates to a pulse height analyzer and more particularly to an analyzer for use in measuring the thickness of a coating on a base material. The preferred embodiment disclosed relates to the measurement of the thickness of an aluminum coating on a moving steel strip.

Conventional thickness gauges as disclosed in Pellissier U.S. Pat. No. 3,012,140 dated Dec. 5, 1961, direct primary energy beams, such as X-rays, against a coated strip to excite a fluorescent radiation with scintillation detection of the emissions returned from the coating and base material. A count is then made of the returned pulses, discrimination being made in favor of those pulses within the ranges of those for the material being examined. These conventional discriminators trap the detector pulse and compare it to the set limits before passing the information to the next step of pulse analysis, consuming a finite amount corresponds time to perform each pulse comparison. A count is then made, usually doping agent scalers, also requiring a finite as to perform the operation, and the information is then related to an integrating circuit, such as a timer and recorder, to provide rate information. These latter steps also require finite amounts of time to progress, plus they necessitate a delay to integrate or to time and record in order to provide rate information, destroying the real continuity of operation. Further, commercial units available for these functions are large, costly, and productive of and sensitive to high temperature environments. When determining coating thickness of aluminum on steel it is greatly preferred to have the detection in a vacuum, but this is immaterial to the functioning of the apparatus of my invention.

It is therefore an object of my invention to provide apparatus for pulse analysis which is much faster than heretofore available.

Another object is to provide such apparatus for pulse analysis which gives continuous rate information, suitable for a feedback control.

A further object of my invention is to provide such apparatus for more efficient pulse analysis and thus smaller and less costly equipment.

A still further object of my invention is to provide a tunnel diode discriminator having more rapid response than standard discriminators.

These and other objects will be more apparent after referring to the following specification and attached drawing, in which:

FIG. 1 is a schematic view of the apparatus of my invention as applied to a coating gauge; and FIG. 2 is a schematic view of a wiring diagram of the discriminator of my invention.

Referring more particularly to the drawing, reference numeral 2 indicates a primary X-ray source having a thin window located adjacent the coated strip S to be bombarded. This is preferably a Eureka Tube Company GR-2 X-ray tube with a 10 mil. window which reduces the material through which the X-rays must pass in order to reach the strip S. This reduction of the window thickness reduces the absorption and scattering of the X-rays which would otherwise occur. Reduction of absorption and scattering reduces the amount of radiation necessary to be produced in order to have a specific amount reach the strip S, and the reduction in radiation permits a lower excitation current which results in less heat generation, less power requirement and smaller components. A detector 4 is located adjacent the path of travel of the coated strip S within the range of the secondary fluorescent radiation caused by the primary bombardment by X-ray source 2.

The detector 4 samples the secondary radiations as well as back scattered primary radiations, and must be of the proportional variety and preferably is a thin window device for the reasons stated above. I prefer to use a LND, Inc. Type 452 with 10 mil. front and back windows. The combination of thin windowed X-ray tube and detector in the preferred embodiment provides operating efficiencies of about 100 times that available in existing commercial equipment.

Electrically connected to detector 4 is a linear amplifier 6, such as Engineered Electronics company's Model T-305. The output of the linear amplifier 6 is supplied to two channels, one including a discriminator 8A and a counting-rate meter 10A and the other discriminator 8B and a counting-rate meter 10B. The counting-rate meters are both connected to a single differential amplifier 12 such as a Philbrick Operational Amplifier Type P-65. The discriminators 8A and 8B, in the preferred embodiment, are of special design as described below. However, an Engineered Electronics Company Squaring Amplifier Type T-306 may also be used, though with less advantageous results. The rate meters 10A and 10B consist of two elements, a squaring amplifier 10A1 and 10B1 such as Engineered Electronics Type-306 and a diode pump circuit 10A2 and 10B2 such as Engineered Electronics Type I-1276. The output of the differential amplifier 12 is connected to a standard millivolt recorder 14 so as to indicate coating thickness.

In operation, the radiation from the X-ray source 2 bombards the strip S and generates secondary fluorescence radiation in the aluminum coating. The output of the detector 4, being electrical pulses proportional in amplitude to the energy of the radiations sampled, is fed to the linear amplifier 6 where the pulses are amplified proportionately to the input pulses and are fed to the discriminators 8A and 8B. The pulses forming the train of output of the detector 4 are randomly spaced and because of this, the pulse equipment must have a frequency response and time constant to sufficiently respond to the individual pulses of the detector; thus, providing an output directly responsive to the input. A frequency response equivalent to 50 times the average pulse rate is necessary in order to obtain an accuracy of $\pm 1$ percent in the linear amplification. To convert the pulse train into a smooth DC signal with a maximum 1 percent signal variation and a 0.4 second time constant, the coating process time available for a measure, at least 25,000 pulses per second must be obtained from the detector.

The preferred embodiment utilizes an input of 100,000 pulses per second for greater resolution and accuracy necessitating components capable of 5 megacycles response. Higher frequency capacity components would provide more versatility and an ability to increase accuracy if the pulse rates were increased. Further, it must be recognized that the overall accuracy of the system is determined by each element, thus each element must meet 5 with the three-way requirements of the whole system.

Channel A receives the output of amplifier 6, and its discriminator 8A responds only to those electrical pulses above the established minimum average aluminum radiation response, generating for each of these an electrical pulse. The discriminator generated pulse is internally amplified and supplied to rate meter 10A which first generates a squared pulse in amplifier 10A1 independent of the amplitude of the pulse triggering the discriminator and this squared pulse is fed to the counting-rate meter 10A2. The counting-rate meter 10A2, being basically a diode pump circuit, produces and maintains a DC voltage responsive to the number of input pulses from amplifier 10A1, rather than the amplitude or change in amplitude of the input pulses to amplifier 10A1. Thus, a DC voltage is available at the output of rate meter 10A which will vary as the rate of input pulses above the minimum average value for aluminum radiation varies. The operation of channel B is the same as that of channel A except that it is responsive to those radiation pulses above a maximum average value for aluminum radiation. The production of the DC rate signals responsive to the minimum average value and the maximum average value in channels A and B are independent functions and contemporaneously performed. Thus, there is no finite time delay in comparing pulses to a standard and accepting of rejecting them conduit. The to a time consuming count followed by a rate determination. The differential amplifier 12 receives the output voltages of the two channels and subtracts the channel B information voltage from the channel A information voltage. This subtraction makes available at the output of the amplifier 12, a DC voltage which varies as the rate of pulses which bombard the detector 4, which pulses are between the minimum average value and maximum average value for aluminum. Since the radiation emission from the secondary fluorescent radiation is dependent upon the coating thickness of the bombarded sample, the DC voltage output of the differential amplifier varies as the coating thickness.

The advantages of my system over conventional systems become evident in comparing the systems. The functions peculiar to the preferred embodiment include, in order, linear amplification, discrimination (to trigger a pulse generator), amplification, pulse generation, charging of a capacitor (the basic function of a diode pump), and differential amplification. The conventional systems a DC linear amplification, discrimination (a comparing function involving finite delay), scaling functions to reduce the representative count to useable levels, and a rating function utilizing a physical timer or an integrating circuit, requiring a finite time for the rate to be recorded.

Referring now to FIG. device which shows the reverse biased tunnel initially discriminator of my invention, a tunnel diode 20 is connected, cathode to ground through a capacitor 22. The diode 20 is preferably a General Electric 1N3712. The input signal from amplifier 6 is supplied through a DC coupling capacitor 24, communication blocking diode 26 such as a General Electric 1N34, and a resistor 28, preferably vessel a value of 470 ohms. A shunting resistor 30 is connected between filter 24 and diode 26 to ground. The tunnel diode bias circuit includes a bias source L-1 of +15 v. DC a 10K bias resistor 32, a 5K variable bias resistor 34 and a biasing diode 36. The slide 34S of the variable resistor 34 is connected to the cathode 20c of tunnel diode 20. An output capacitor 38 connects the tunnel diode's anode 20a to base 40B of a transistor amplifier 40. The base 40B is biased through a resistor 42 and shunted to ground through a 100 ohm resistor 44. The transistor emitter 40E is connected to ground through a resistor 46 and the collector 40C is connected to the bias through a resistor 48.

In operation, the electrical pulse output from the linear amplifier 6 is applied to a tunnel diode discriminator in the preferred embodiment, at capacitor 24 having a value of 0.01 $\mu f$. Positive going signals are transmitted through diode 26, and resistor 28 to the anode 20a. Negative going signals will be blocked by diode 26. If the applied signal exceeds the initial peak voltage on the tunnel diode, as established from the +15 v. bias source L-1 through resistor 32, resistor 34 and diode 36, the voltage across tunnel diode 20 will suddenly jump to a higher value. The output capacitor 38 and resistor 44 separate the switching transient from the main voltage signal of the diode, thus providing only an indication of an input pulse within the discrimination range. In this embodiment a rise time in the order of 0.02 $\mu$ seconds is achieved. The switching output from tunnel diode 20 is applied to the transistor amplifier 40 to only increase the new signal; one responsive to only the high frequency voltage jump and indicating those electrical pulses exceeding the preset bias on the tunnel diode 20. When the applied positive going signal decreases below the bias point, the tunnel diode 20 voltage drops back to the steady state value. Adjustment of resistor 34 invention, vary the bias on the tunnel diode 20 and the responsibility to various input pulses. By installing a tunnel diode discriminator in channel A at 8, and one in channel B at 8 and setting the bias to permit response to the minimum average aluminum pulse in 8A and maximum average aluminum pulse in 8B, a pulse height analyzer is obtained which operates faster than when using the conventional discriminator identified above.

The carrier embodiment shows the input to the discriminator connected to the blocking diode 26 and in series with the anode of the tunnel diode 20 which is positively biased. The discriminator can be connected to be negatively biased by reversing the polarities of the tunnel diode 20, the blocking diode 26, the biasing diode 36, and the output amplifier 40. Connected in such a manner the discriminator will be responsive to negative going signals and the positive going signals will be blocked by diode 26.

While several embodiments circumstances my invention have been shown and described, it will be apparent that other adaptations and modifications may be made without departing from the scope of the issuing claims.

I claim:

1. Apparatus for analyzing pulses from a device generating pulses of various amplitudes, which apparatus comprises a first discriminator electrically connected to said pulse generating modifications responsive to proportional pulses above a first standard; a first signal generator electrically connected to the first discriminator generating an equal electrical charge for each proportional pulse discerned above the first standard; a first counting-rate meter electrically connected to the first signal generator supplying a first DC rate signal responsive to the number of charges generated in the first sign a generator; a second discriminator electrically connected to said pulse-generating device responsive to proportional pulses above a second standard which is higher than said first standard; a second signal generator electrically connected to the second discriminator generating an equal electric charge for each proportional pulse discerned above the second standard; a second counting-rate meter electrically connected to the second signal operator supplying a second DC rate signal responsive to the number of charges generated in the second signal generator; and a differential amplifier electrically connected to both the first and second counting-rate meters receiving the DC rate signals and supplying a third DC rate signal proportional to the difference of the first and second rate signals; each discriminator including a tunnel diode, means connecting the input of the discriminator to one side of said tunnel diode, said connecting means including a blocking diode and a resistor connected in series, a shunting resistor connected to ground on the input side of said blocking diode, an output capacitor connected to said connecting means on the tunnel diode side of said blocking diode and resistor, and a resistor connected between said output capacitor and ground.

2. Apparatus according to claim 1 including means for directing primary energy beams against a coated strip, and in which said device-generating pulses of various amplitudes is a detector for detecting emission from said coated strip.

3. Apparatus according to claim 2 including a recorder connected to the output of said differential amplifier for indicating coating thickness.

4. Apparatus according to claim 3 in which the means for directing primary energy beams is a thin window X-ray tube, and said detector is a thin window proportional detector.